United States Patent [19]

Eslambolchi et al.

[11] Patent Number: 5,870,383
[45] Date of Patent: Feb. 9, 1999

[54] PROVISIONING TECHNIQUE FOR CUSTOMER SERVICE

[75] Inventors: Hossein Eslambolchi, Basking Ridge; Houssam Halabi, Freehold, both of N.J.

[73] Assignee: AT&T Corp, Middletown, N.J.

[21] Appl. No.: 957,948

[22] Filed: Oct. 27, 1997

[51] Int. Cl.⁶ .................................................... H04Q 1/20
[52] U.S. Cl. ............................ 370/230; 370/384; 370/522
[58] Field of Search ..................... 370/221, 222, 370/223, 224, 242, 243, 244, 230, 522, 384

[56] References Cited

U.S. PATENT DOCUMENTS 5,444,693  8/1995  Arslan et al. .
5,623,480  4/1997  Hartmann et al. ...................... 370/241
5,629,938  5/1997  Cerciello et al. ........................ 370/384
5,631,902  5/1997  Yoshifuji .................................. 370/388

*Primary Examiner*—Chau Nguyen
*Assistant Examiner*—Thinh Vu
*Attorney, Agent, or Firm*—Robert B. Levy

[57] ABSTRACT

The need for manual verification of service on a desired cross-connect in a cross-connect system prior to provisioning may be eliminated by modifying the logic of the cross-connect system to take account of an internal indication characteristic of whether service is present on the cross-connect. Upon receipt of a NORMAL command, the cross-connect system only executes the command to disconnect the cross-connect when no service is present. However, upon receipt of a FORCED command, the cross-connect system executes the command to disconnect the cross-connect irrespective of the existence of any service thereon. Moreover, in response to an indication of service and denial of the NORMAL command, a FORCE command may be issued instead to effect disconnection of the cross-connection with such disconnection is desired irrespective of the existence of service thereon.

11 Claims, 1 Drawing Sheet

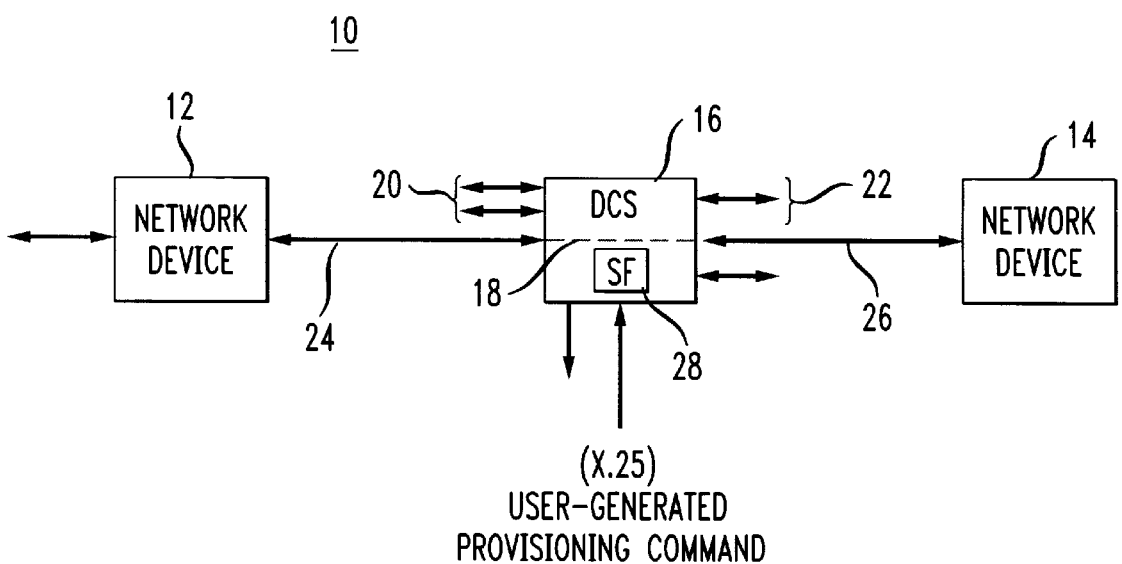

PROVISIONING TECHNIQUE FOR CUSTOMER SERVICE

TECHNICAL FIELD

This invention relates to a technique for provisioning a network to provide a customer with dedicated service.

BACKGROUND ART

Most providers of telecommunications services, such as AT&T, typically offer both dedicated and non-dedicated service. A customer wishing a connection through a service provider's network only for the duration of a call typically seeks non-dedicated service. In practice, the service provider provides such non-dedicated service by establishing a path through its network to the called party upon initiation of a call from the calling party. After completion of the call, the service provider tears down the previously established path. For each successive call made by a customer under non-dedicated service, the service provider establishes a path and thereafter tears it down. In some instances, a portion of the path provided for non-dedicated service may remain in place. For example, a portion of the non-dedicated path may include a trunk or channel connecting a switching system and a piece of transmission equipment that remains permanently in place. However, other portions of the non-dedicated path, such as internal links within the switching system, only exist for the duration of the call.

Many businesses and institutions that initiate large volumes of telecommunications traffic to a single location, such as a branch office or remote facility, achieve greater efficiency and reduced costs by utilizing a dedicated network path to route such traffic. In contrast to the transient network path associated with non-dedicated service, the entire network path associated with dedicated service exists before call initiation and remains in place after call completion. In other words, the network path associated with dedicated service remains available so long as the customer requests such service, regardless of the existence of any traffic.

The process of selecting a dedicated path for dedicated service, or the dedicated portion of a path for non-dedicated service, is known as provisioning. Most telecommunications service providers provision a dedicated path, such as a T1 trunk, in the following manner. First, a customer (or the service provider itself) makes a service request for a dedicated path. Upon receipt of the request, the service provider takes inventory of its existing inventory of trunks. From its available trunk inventory, the service provider selects an appropriate route that will satisfy the requesting customer's requirements.

Invariably, the selected route runs through at least one Digital Cross-Connect system (DCS). Such systems are well known and connect at least one incoming trunks to at least one outgoing trunk in response to a provisioning command, often supplied remotely to the DCS from a provisioning center located. While most service providers maintain accurate data base records of the cross-connections provided by each DCS, conflicts can and do arise between a newly created customer order and a pre-existing "ghost" cross-connect not entered in the cross-connect data base. Presently, to avoid interrupting present service, execution of the new customer order must await verification of a pre-existing cross-connect.

Today, verification of pre-existing customer service requires two manual operations. First, the provisioning center first dispatches a technician from the On-Site Work Force (OWSF) to the DCS to check the presence of any pre-existing signal on selected cross-connect using an appropriate test command. Secondly, the technician performs the appropriate test and analyzes the result. Obviously, if valid service exists, the service provider will not implement new service in conflict with such pre-existing service.

External verification of pre-existing service by the above-described manual process is costly and time consuming. Manual verification of pre-existing service delays implementation of new service, creating customer dissatisfaction.

Thus, there is a need for a technique for improving verification of pre-existing service on a DCS system.

BRIEF SUMMARY OF THE INVENTION

Briefly, the present invention concerns a technique for provisioning customer service on a desired cross-connect provided by a cross-connect system. In accordance with the invention, the cross-connect system receives one of a FORCED or NORMAL provisioning commands from a provisioning center to disconnect an existing cross-connect. Upon receipt of a provisioning command, the cross-connect system examines an internal status indicator that indicates whether the desired cross-connect is in or out of service. (A cross-connect that carries customer traffic is in service. A cross-connect that carries no traffic is out of service or idle.) Upon receipt of a NORMAL provisioning command, the cross-connect system executes that provisioning command if the internal service indicator indicates an out of service condition for the desired cross-connect. Should the cross-connect system indicate an in-service condition, the system denies execution of the NORMAL command. In this way, existing service suffers no interruption. In contrast, upon receipt of a FORCED command, the cross-connect system executes the command irrespective of the state of the internal status indicator. Indeed, in response to an indication by the service indicator of service on a particular cross-connect, the provisioning center may re-issue a NORMAL command as a FORCED command to provision the cross-connect regardless of the service thereon.

By taking advantage of the service status indication provided by the cross-connect system, the above-described method simplifies the provisioning process by eliminating the need to manually check the status on the desired cross-connect.

BRIEF DESCRIPTION OF THE DRAWINGS

FIG. 1 shows a portion of a network on which the provisioning process of the invention may be implemented.

DETAILED DESCRIPTION

FIG. 1 depicts a portion of a communications network 10, such as a portion of the telecommunications network maintained by AT&T. In the illustrated embodiment, the network portion 10 includes a first network communications device 12, such as for example, a local or toll telecommunications switching system as are well known in the art. An example of such a toll telecommunications switching system is the 4ESS switch now manufactured by Lucent Technologies. The network portion 10 of the illustrated embodiment also includes a second network device 14, such as for example, a transmission system as are known in the art. Alternatively, the network device 12 could comprise another telecommunications switch, an echo cancellation system or other type of equipment commonly employed in a telecommunications network. As will be appreciated from the discussion below, the exact nature of the network devices 12 and 14 is not critical to the provisioning method of the invention.

The network elements 12 and 14 are connected to each other through a Digital Cross-Connect System (DCS) 16, which in the preferred embodiment, comprises a Model 3/1 DCS manufactured by Alcatel Network Systems of Richardson, Tex. In response to a user-generated provisioning command, which may be of an X.25 protocol, the DCS 16 provides a cross-connect 18 (e.g., a communications path) between a selected one of a set of first ports 20 and a selected one of a set of second ports 22, as specified by the command. Thus, in response to the appropriate user-generated provisioning command, the DCS 16 can provide cross-connection 18 between a trunk 24, linked to the network device 10, and a trunk 26, linked to the network device 14. While FIG. 1 illustrates the single cross-connect 18, in practice, the DCS 16 possesses the capability of providing a plurality of such cross-connects, each linking a selected one of ports 20 to a selected one of ports 22.

Presently, before issuing a provisioning command to the DCS 16 to modify a particular cross-connect 18, the service provider manually dispatches a technician to verify whether service presently on the cross-connect to avoid terminating an undocumented ("ghost") connection. Such manual verification delays provisioning of new customer service, creating customer dissatisfaction.

The present invention eliminates the need for manual verification prior to disconnection by taking advantage of a capability presently available on the DCS 3/1 type digital cross-connect system comprising the DCS 16. The DCS 3/1 cross-connect system manufactured by Alcatel Network Systems has status indicator (flag) 28 associated with each cross-connect 18 for indicating whether the cross-connect is in service (i.e., carrying customer traffic) or out-of service (i.e., idle).

To eliminate manual verification of the cross-connect status, we take account of the status indication provided by the DCS 16 in commanding the DCS to provision a particular cross-connect. In particular, we modify the logic of the DCS 16 to support two separate types of provisioning disconnect (DISC) commands, a NORMAL command, and a FORCED command, rather than the single type of command presently employed. As will be better appreciated from the logic statement presented below, the NORMAL command effects a disconnect of an existing cross-connect only if the cross-connect is out-of service. By contrast, the FORCED command effects a disconnect of the cross-connect irrespective of whether the cross-connect is in or out-of service.

The following logic statement describes the syllogism followed by the DCS 16 in connection with the FORCED and NORMAL user-generated provisioning commands:

```
Receive a DISC-Cross-Connect Command
    If ( Cross-Connect-State is In-Service State ) Then If
    FORCED_Mode Parameter is set) Then DISCONNECT the
    Cross-Connect Else
        Deny The DISC - Cross-Connect Command
        Return Code = Cross-Connect-In-Service
    Else
        If (Cross-Connect is Out-of service State) Then
            accept and execute the DISC-Cross-Connect Command
```

As may be appreciated from the foregoing logic statement, the DCS 16, upon receipt of a DISC (disconnect) command, checks whether the command is of the NORMAL or FORCED state. The DSC further checks the state of the status flag 28 to determine if the cross-connect for which a disconnect is sought is either in or out-of service. If the particular cross-connect is in service, then the DCS 16 denies execution of a NORMAL DISC command, and instead, responds with a Return Code (i.e., a return signal) to the provisioning center that the particular cross-connect for which a disconnect is sought is in service. However, if the DISC command is of the FORCED variety, then the DSC 16 executes the command even if there is service.

As may be appreciated, the above-described technique avoids the need for manual verification since the DSC 16 responds to a NORMAL DISC command with an indication of service when such service is indeed present. Thus, a technician need to journey to the DSC 16 to learn whether service is present. Indeed, in response to a "service present" Return Code, the provisioning center may then supply a FORCED DISC command to effect removal of the desired disconnect notwithstanding the existence of service thereon. For example, the provisioning center may decide that while service is indeed present, it may not be desired, and removal is proper.

It is to be understood that the above-described embodiments are merely illustrative of the principles of the invention. Various modifications and changes may be made thereto by those skilled in the art which will embody the principles of the invention and fall within the spirit and scope thereof. For example, while the NORMAL and FORCED commands have been described in connection with disconnection of a particular cross-connect, other types of provisioning operations could be associated with such commands.

What is claimed is:

1. A method for provisioning customer service on a desired cross-connect within a cross-connect system, comprising the steps of:

receiving, at the cross-connect system, at least one of a FORCED and NORMAL provisioning commands to initiate provisioning of service on the desired cross-connect;

automatically examining, within the cross-connect system, an internal status indicator that provides an indication of whether the desired cross-connect is presently in service or out-of -service;

responsive to a NORMAL provisioning command, denying execution of said NORMAL provisioning command to provision the desired cross-connect when the internal status indicator indicates the desired cross-connect is in service; otherwise executing the NORMAL provisioning command to provision service on the desired cross-connect when the internal status indicator indicates the desired cross-connect is out-of-service;

responsive to a FORCED provisioning command, executing said FORCED provisioning command to provision service irrespective of the indication of the internal status indicator.

2. The method according to claim 1 wherein each of the NORMAL and FORCED commands, when executed, effects disconnection of the cross-connect.

3. The method according to claim 1 further including the step of generating at the cross-connect system a prescribed return code in response to an indication by the status indicator of the existence of service on the cross-connect.

4. The method according to claim 3 including the step of supplying the cross connect system with the FORCED provisioning command in response to the prescribed return code.

5. The method according to claim 1 wherein the FORCED and NORMAL provisioning commands are of the X.25 protocol.

6. The method according to claim 1 wherein the FORCED and NORMAL commands are generated remotely from the cross-connect system.

7. A method for disconnecting customer service on a desired cross-connect within a cross-connect system, comprising the steps of:

receiving, at the cross-connect system, at least one of a FORCED and NORMAL disconnect commands to effect disconnection of service on the desired cross-connect;

automatically examining, within the cross-connect system, an internal status indicator that provides an indication of whether the desired cross-connect is presently in service or out-of-service;

responsive to a NORMAL provisioning command, denying execution of said NORMAL provisioning command to provision the desired cross-connect when the internal status indicator indicates the desired cross-connect is in service; otherwise executing the NORMAL provisioning command to disconnect service on the desired cross-connect when the internal status indicator indicates the desired cross-connect is out-of-service;

responsive to a FORCED provisioning command, executing said FORCED provisioning command to disconnect service irrespective of the indication of the internal status indicator.

8. The method according to claim 7 further including the step of generating at the cross-connect system a prescribed return code in response to an indication by the status indicator of the existence of service on the cross-connect.

9. The method according to claim 8 including the step of supplying the cross-connect system with the FORCED provisioning command in response to the prescribed return code.

10. The method according to claim 7 wherein the FORCED and NORMAL provisioning commands are of the X.25 protocol.

11. The method according to claim 1 wherein the FORCED and NORMAL commands are generated remotely from the cross-connect system.

* * * * *